Sept. 4, 1956

C. G. ROBB ET AL 2,761,832

LIQUID TREATING APPARATUS

Filed Aug. 24, 1950

INVENTORS
SAMUEL I. WARD
CHARLES G. ROBB

BY *J. Jordan Kunik*

ATTORNEY

Sept. 4, 1956 C. G. ROBB ET AL 2,761,832
LIQUID TREATING APPARATUS
Filed Aug. 24, 1950 2 Sheets-Sheet 2

INVENTORS
SAMUEL I. WARD
CHARLES G. ROBB
BY
ATTORNEY

United States Patent Office 2,761,832
Patented Sept. 4, 1956

2,761,832

LIQUID TREATING APPARATUS

Charles G. Robb, South Glastonbury, and Samuel I. Ward, West Hartford, Conn., assignors to Crystal Research Laboratories, Inc., a corporation of Connecticut Application August 24, 1950, Serial No. 181,196

4 Claims. (Cl. 210—24)

This invention relates to liquid treating apparatus and more particularly to a portable unit for demineralizing water and for storing and testing said water after treatment.

Demineralization of water by means of ion exchange resins has in recent years developed into extensive use, especially where there are large volume requirements as in electroplating processes and steam boiler operation. It has been found that water treated by ion exchange resins has been substantially as satisfactory as water that has been obtained by the more costly and time consuming process of distillation.

The present invention, however, is addressed to the particular problem of treating water in small volumes by means of ion exchange resins for use in small laboratories, pharmacies and battery stations where relatively small volumes of mineral-free water are required. For such uses we have invented a novel portable apparatus, the object of which is to demineralize relatively small volumes of water, store said water and provide for the testing of the treated water at any convenient time.

Another object is the provision of a simple apparatus by which water or other liquid may be treated by gravity feed through a cartridge in an apparatus which also serves as a storage reservoir in which the liquid can be tested in situ.

Other objects of the invention will be apparent from the following description and accompanying drawings taken in connection with the appended claims. However, we desire to have it distinctly understood that we do not intend to limit ourselves to the exact details shown or described, but that we intend to include as part of our invention all such obvious changes and modifications of parts as would fall within the scope of the claims.

Figure 1:
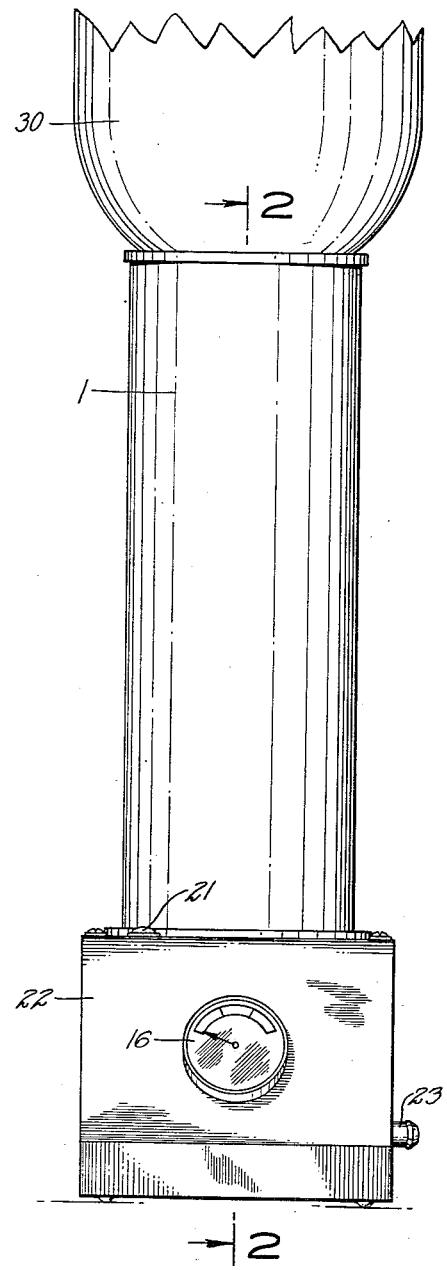
Fig. 1 is a front external view of our demineralizing apparatus.
Figure 2:
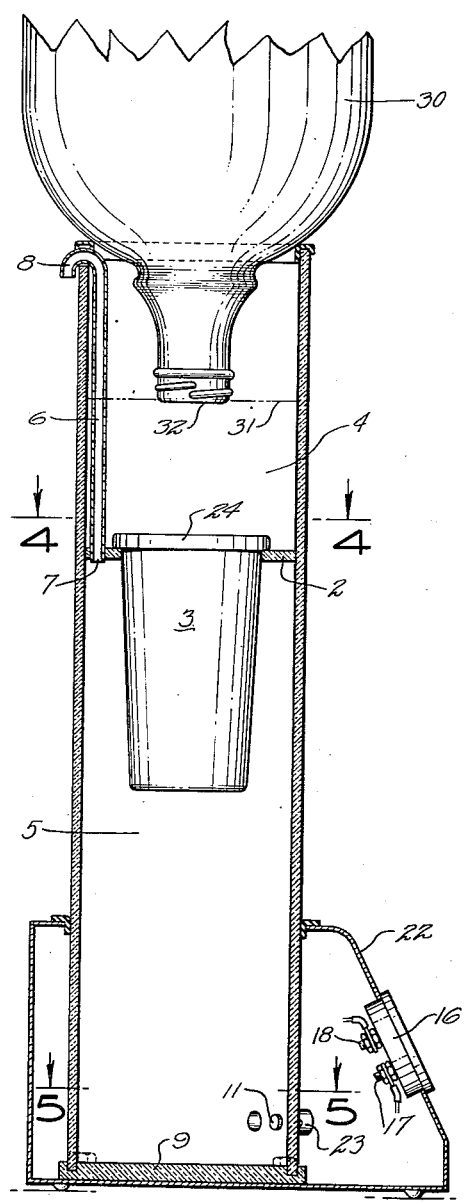
Fig. 2 is a vertical section along plane 2—2 of Fig. 1.

As shown in Figs. 1 and 2, the demineralizing apparatus of the present invention consists essentially of a vertical container or tube 1, made preferably of a transparent or translucent material so that the supply of treated water may be observed in order that adquate warning may be given for replenishment. The tube may be made of glass, polystyrene, methyl methacrylate or like inert material.

The tube may be of any type of cross-section although only the cylindrical type is illustrated. Substantially in the middle region of the inside of said tube, there is a shelf or ring 2 of a suitable material securely fastened to the inside wall of the tube by means of a water-tight and air-tight seal. Said ring 2 has an aperture in which is supported a cartridge 3 which contains the ion exchange resin or resins. The material of the walls of said cartridge or container 3 is so chosen as to be sufficiently flexible and pliable to form an effective water-tight seal with the inner periphery of supporting ring member 2.

Alternatively a cartridge having stiff inflexible walls could also be used provided ring or shelf 2 is made of a strong but somewhat pliable or conforming material such as rubber. Otherwise a rubber collar may be attached to the periphery of the aperture of ring 2 to provide a water-tight seal. In any event, it is preferable to provide pliability and conformability either in the walls of cartridge 3 or in the ring 2 for obtaining a water-tight seal in order to obviate the expense of precision machining and fitting.

It will be observed that the combination of support member or shelf 2 and cartridge 3 effectively divides tube 1 into two separate chambers 4 and 5. Although chambers 4 and 5 are illustrated as having the same cross-section, container 1 may be altered in shape so that chamber 5 may have a larger or smaller size than chamber 4.

A small tube 6 is provided for relieving air pressure in the lower reservoir chamber 5 into the outer atmosphere, the lower end 7 of said tube 6 being sealed through collar 2. Tube 6 extends upward along the inside of chamber 4 to just below the top edge of tube 1 where its upper end 8 protrudes through the wall of tube 1. The protruding open end 8 of tube 6 is preferably bent downward to prevent accidental entry of impurities to the lower chamber 4.

Figure 5:
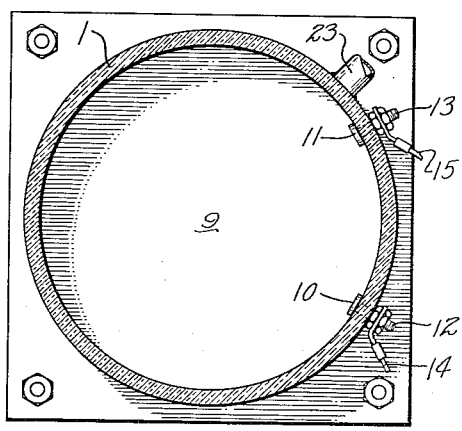
Fig. 5 is an enlarged horizontal cross-sectional view taken along the plane 5—5 of Fig. 2.
Figure 6:
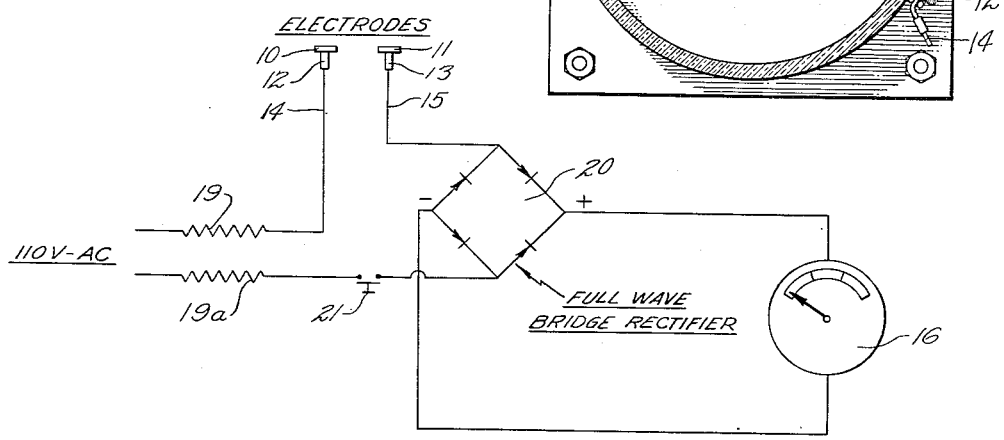
Fig. 6 shows the electrical circuit contained in the testing portion of the apparatus.

Tube 1 has a base 9 to which it is sealed and on which it stands. Near the bottom of chamber 5, two electrodes 10 and 11 (see Fig. 5) are fastened in the wall of tube 1 at a suitable distance apart by means of shafts 12 and 13 respectively, making a water-tight seal with the wall of tube 1. Lead wires 14 and 15 connect electrodes 10 and 11 respectively to a milliammeter 16 by way of binding posts 17 and 18. Meter 16, which may be provided with a 110 volt alternating current power supply (see Fig. 6), has two 50,000 ohm resistors 19 and 19a and a full wave bridge rectifier 20 and a push-button switch 21 which is normally in the open circuit position. The rectifier supplies current to the direct current milliammeter 16. Alternating current is used across electrodes 10 and 11 which are made of a non-corrosive material that does not dissolve under the stimulus of electric current. The electrodes may consist of Monel metal, tantalum, paladium or platinum or may be coated with thin platings of said materials. The push-button switch 21 is provided for the purpose of eliminating continual current flow between the electrodes which would otherwise cause possible electrolysis.

The meter and its circuit elements are fixed in a metal housing 22 which surrounds the lower end of tube 1 and helps to support it as a stand. Of course, the electrical elements are properly insulated from said housing. The electrical circuit of Fig. 6 may be modified in suitable manner and the meter may be calibrated to read "parts per million of ionizable salts" or "good, fair, poor." That is a matter of choice depending upon where the apparatus is to be used and by whom.

The lower end of tube 1 has an outlet tube 23 which extends through housing 22 and to which a hose can be attached for drawing off the treated water from chamber 5. Suitable valve arrangements may be made for periodic discharge of treated water at desired times.

Figure 3:
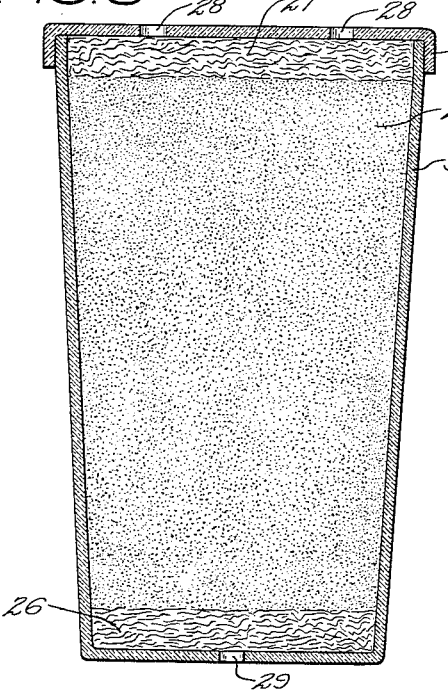
Fig. 3 is an enlarged vertical section of a filled ion exchange resin container.
Figure 4:
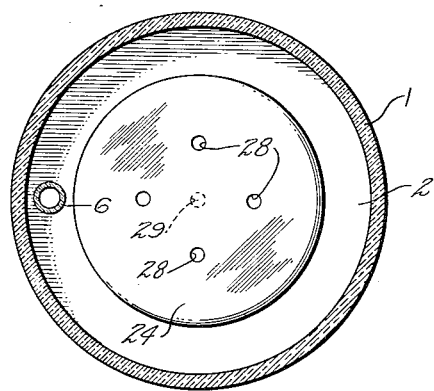
Fig. 4 is an enlarged horizontal cross-sectional view taken along the plane 4—4 of Fig. 2.

Cartridge 3 is shown illustrated in Figure 3 as a tapered cup, a shape which is preferred although other desirable shapes may be utilized. Cup 3 has a removable top closure 24 which is snap fastened to the top opening of said cup and provides a water-tight seal. Cartridge 3 contains a mass 25 of ion exchange resin or a mixture of different varieties of ion exchange resins through which the untreated water passes for the removal of certain impurities. The mass of resins is supported by a permeable bed 26 of inert fibrous material such as glass wool, asbestos, polystyrene or synthetic plastics such as nylon or Saran which prevents packing of the resins against the outlet aperture. The top of the resin mass is covered with another bed 27 of similar fibrous material to permit the water to spread out evenly over the top of the resin bed. The two fibrous beds 26 and 27 also serve to filter out undesirable solid particles from the liquid.

The cover 24 of the cartridge is provided with at least one aperture but preferably with several inlet holes 28 and at least one outlet aperture 29 in the bottom. The size of outlet aperture 29 is particularly determined as to provide a slow enough flow for optimum demineralization. The size of aperture 29 will depend upon the type of ion exchange resins used, the nature of the water available in a particular community and the average amount of pressure of the liquid contained in chamber 4. The outlet aperture 29 should be arranged to permit a smaller flow of liquid than the aggregate flow through apertures 28 on top of the cartridge so that the liquid is backed up through the mass of the resin bed whereby complete saturation is assured for complete treatment and to minimize channeling through the bed.

In operation, a cartridge 3 containing a charge of fresh ion exchange materials is placed in position within the collar member 2. A supply of untreated or tap water is poured into chamber 4. If desired, a bottle 30 containing such untreated water may be inverted over chamber 4 so as to provide a self-regulating system wherein the liquid level 31 rises to the mouth 32 of the bottle and maintains intermittent but regular flow. The untreated water filters through the resin bed and becomes demineralized in the well known manner and flows into storage chamber 5 from which it may be drawn off through outlet 23 as desired.

The charge of ion exchange resin in cartridge 3 is capable of demineralizing a large volume of water and in the present apparatus several passes of water may be made before the resin is no longer capable of absorbing the undesirable electrolytic impurities. In order to indicate the approaching "exhaustion" of the resin, the operator of the apparatus presses push-button switch 21 and takes a reading on the meter which indicates the amount of ionized salts that may be present in the treated water in reservoir chamber 5. Such a reading may readily be made with each batch of water treated.

When the conductivity of the treated water in chamber 5 exceeds a certain permissible maximum standard set for the particular use to which the water is to be made, then the exhaustion of the resin is indicated and the cartridge is replaced with a fresh cartridge.

Alternatively the resin bed may be removed from the cartridge, regenerated by well-known methods and replaced in the cartridge. If any water in chamber 5 exceeds the maximum allowed conductivity, it may easily be drawn off and discarded and the apparatus is again ready for operation after the replacement with the new cartridge. Chamber 5 also serves as a reservoir where a supply of demineralized or treated water may be stored for use as required. If the walls of tube 1 are transparent or translucent, the amount of said supply can be visually determined and the supply replenished, if necessary, by introducing more untreated water into chamber 4 to pass through the resin in cartridge 3.

The resin mass 25 supplied in the cartridge is a homogeneous mixture of both cation and anion exchange materials which obviates the necessity of passing untreated water through several successive beds of different types of resins. The single charge of resins in cartridge 3 consists of anion and cation resins of a type which may be intimately mixed without the danger of mutual reaction and consequent disintegration, saturation or other nullifying effects. These resins, for water demineralizing, are properly converted and regenerated to the hydrogen ($H^+$) and the hydroxyl ($OH^-$) forms. The resins are mixed in proper proportions to give a balanced blend which takes into consideration the exhaustion capacities of the anion and cation exchange resins. In one blend, for instance, approximately two parts by volume of an anion exchange resin is mixed with one part by volume of a cation exchange resin. Other varying proportions may be specified according to the reqirements of the type of water to be treated.

Mixed bed anion and cation exchange resins are now available and such are preferred for use in cartridge 3. It is also possible, however, to arrange for a plurality of different layers of anion and cation exchange resins respectively to be placed in the cartridge at successive levels provided the proper resins are selected for such operation. The important consideration as it concerns the present invention is that the ion exchange process takes place preferably within one cartridge which is readily removable when exhausted and easily replaceable by a fresh cartridge.

In some embodiments of our invention it may be desired to provide several apertures in shelf 2 for the accommodation of several cartridges as described. Also it is contemplated that container 1 may be provided with two or more shelves 2, one above the other, which would each support a cartridge of different types of ion exchange resins, or for the provision of some other type of reactant which may be required in the treatment or purification of liquids. The important feature that still obtains is that the liquid is treated by simple gravity feed with a reservoir provided in the same apparatus where the stored treated liquid may conveniently be tested. These and other variations are contemplated as being within the purview and scope of this specification and appended claims.

We claim:

1. A water treating apparatus comprising a container, a shelf on the inside of said container, said shelf having at least one aperture, a removable cartridge supported in said aperture, the walls of said cartridge being pliable and conformable with the inner periphery of said aperture to form a water-tight seal with said shelf, said cartridge and shelf dividing said container into an upper chamber and a lower reservoir chamber, the top of said cartridge communicating with the upper chamber and the bottom of said cartridge communicating with the reservoir chamber.

2. A device according to claim 1 further comprising inlet means in the cartridge communicating with the upper chamber and discharge means in the cartridge communicating with the reservoir chamber, the discharge means being selected to provide a smaller volume of liquid flow than permitted by the inlet means whereby any liquid passing through said cartridge is backed up to permit complete saturation of the water treating material within said cartridge.

3. A water treating apparatus comprising a container, a shelf on the inside of said container, said shelf having at least one aperture, a removable cartridge supported in said aperture, the walls of said cartridge being pliable and conformable with the inner periphery of said aperture to form a water-tight seal with said shelf, said cartridge and shelf dividing said container into an upper chamber and a lower reservoir chamber, the top of said cartridge communicating with the upper chamber and the bottom of said cartridge communicating with the reservoir chamber, electrodes in said reservoir chamber, and a meter connected to said electrodes for testing the liquid in said reservoir chamber.

4. A water treating apparatus comprising a base, a vertical container supported in said base, a shelf on the inside of said container, said shelf having at least one aperture, a removable cartridge supported in said aperture, the walls of said cartridge being pliable and conformable with the inner periphery of said aperture to form a water-tight seal with said shelf, said cartridge and shelf dividing said container into an upper chamber and a lower reservoir chamber, the top of said cartridge communicating with the upper chamber and the bottom of said cartridge communicating with the reservoir chamber, electrodes in said reservoir chamber, and a meter positioned in said base and connected to said electrodes, said meter being adapted to indicate the relative purity of the liquid within the reservoir and to indicate the state of exhaustion of the water treating material within said cartridge.

References Cited in the file of this patent

UNITED STATES PATENTS

| Number | Name | Date |
|---|---|---|
| 598,468 | Lynn | Feb. 1, 1898 |
| 1,052,440 | Hagg | Feb. 4, 1913 |
| 1,208,882 | Young | Dec. 19, 1916 |
| 1,320,036 | Crockatt | Oct. 28, 1919 |
| 1,704,925 | Robertson | Mar. 12, 1929 |
| 1,851,481 | Rabjohn | June 7, 1932 |
| 1,889,485 | Martin | Nov. 29, 1932 |
| 2,003,760 | Sweeney et al. | June 4, 1935 |
| 2,167,225 | Van Eweyk | July 25, 1939 |
| 2,304,453 | Gudmundsen | Dec. 8, 1942 |
| 2,335,458 | Senyal | Nov. 30, 1943 |
| 2,365,492 | Pratt | Dec. 19, 1944 |
| 2,428,329 | Ham et al. | Sept. 30, 1947 |
| 2,461,505 | Daniel | Feb. 15, 1949 |
| 2,525,497 | Monfried | Oct. 10, 1950 |
| 2,528,058 | Jordan | Oct. 31, 1950 |

FOREIGN PATENTS

| Number | Country | Date |
|---|---|---|
| 1,427 | Great Britain | 1872 |
| 809 | Great Britain | 1882 |
| 295,004 | Great Britain | Dec. 20, 1928 |
| 664,557 | France | Apr. 23, 1929 |
| 360,172 | Great Britain | Nov. 5, 1931 |
| 462,392 | Great Britain | Mar. 9, 1937 |